(12) United States Patent
Stuetzler

(10) Patent No.: US 6,864,477 B2
(45) Date of Patent: Mar. 8, 2005

(54) OPTICAL DEFORMATION SENSOR WITH OPERATIONAL TESTING BY DIFFERENT WAVELENGTHS, FOR SIDE CRASHERS

(75) Inventor: Frank-Jürgen Stuetzler, Farmington Hills, MI (US)

(73) Assignee: Robert Bosch GmbH, Stuttgart (DE)

( * ) Notice: Subject to any disclaimer, the term of this patent is extended or adjusted under 35 U.S.C. 154(b) by 56 days.

(21) Appl. No.: 10/048,261

(22) PCT Filed: May 9, 2001

(86) PCT No.: PCT/DE01/01765
§ 371 (c)(1),
(2), (4) Date: May 24, 2002

(87) PCT Pub. No.: WO01/90697
PCT Pub. Date: Nov. 29, 2001

(65) Prior Publication Data
US 2002/0162952 A1 Nov. 7, 2002

(30) Foreign Application Priority Data
May 26, 2000 (DE) .......................... 100 26 330

(51) Int. Cl.⁷ ................................ G01J 1/04
(52) U.S. Cl. ............................. 250/227.11; 250/227.14
(58) Field of Search .............................. 398/10, 13, 14; 250/227.11–227.19, 231; 356/32–35.5; 385/12, 13

(56) References Cited

U.S. PATENT DOCUMENTS

| 4,270,050 A | 5/1981 | Brogardh .................. 250/231.1 |
| 4,727,254 A | 2/1988 | Wlodarczyk ........... 250/227.18 |
| 5,109,443 A * | 4/1992 | Hill et al. ...................... 385/13 |
| 5,118,931 A | 6/1992 | Udd et al. ............. 250/227.16 |
| 5,680,489 A * | 10/1997 | Kersey .......................... 385/12 |
| 6,185,020 B1 * | 2/2001 | Horiuchi et al. .............. 398/31 |

FOREIGN PATENT DOCUMENTS

| DE | 44 33 046 | 3/1996 |
| DE | 197 57 118 | 7/1999 |

* cited by examiner

Primary Examiner—Thanh X. Luu
(74) Attorney, Agent, or Firm—Kenyon & Kenyon

(57) ABSTRACT

The deformation sensor does not require a supplementary sensor to check functionality. This deformation sensor includes an optical transmission medium, multiple transmission elements, which couple the light of various wavelengths into the transmission medium, and multiple reception elements, which selectively couple the transmitted light out of the transmission medium according to wavelength. An evaluation unit detects deviations between the output signals of the reception elements and signals a malfunction of the sensor if the deviations exceed a preset measure.

14 Claims, 2 Drawing Sheets

OPTICAL DEFORMATION SENSOR WITH OPERATIONAL TESTING BY DIFFERENT WAVELENGTHS, FOR SIDE CRASHERS

FIELD OF THE INVENTION

The present invention relates to a deformation sensor, made of an optical transmission medium, means for coupling light into the transmission medium, and means for receiving the light transmitted via the transmission medium, with an evaluation unit being present which detects the change in intensity of the light received depending on the deformation.

BACKGROUND INFORMATION

A deformation sensor is known from German Patent Application No. 42 20 270 A1. Such a deformation sensor, which includes an optical transmission medium having transmission and reception elements coupled to it, is particularly to be used for detecting deformations of the vehicle body which a vehicle undergoes in the event of a crash. Such an optical deformation sensor can preferably be used for detecting side crashes in vehicles. An optical transmission medium, which includes an optical waveguide as in the specification cited, changes its light transmission properties due to the microbending effect upon curving such as that which occurs in the event of a deformation of the vehicle body. Specifically, the intensity of the light transmitted changes if the optical waveguide undergoes a curvature due to a deformation of the vehicle body part onto which the optical waveguide is affixed.

As described in U.S. Pat. No. 5,917,180, the optical transmission medium of a deformation sensor includes a deformable, light-transmitting body, made of, for example, polyurethane foam. The optical scattering properties of this deformable, light-transmitting body change if pressure is exerted on it, which occurs, for example, in the event of a deformation of the vehicle body part onto which the body is affixed.

In order to avoid spurious trippings of restraint devices (airbags, seat belt tightening system, roll cage, etc.) caused by the crash sensor in the vehicle, and also to avoid faulty non-tripping in the event of a crash, continuous function checking of the deformation sensor is necessary. The related art in this connection is the use of at least one further sensor of another type—this can be, for example, an acceleration sensor which is positioned in addition to the deformation sensor at any other location in the vehicle. As described in German Patent No. 42 20 270, the function checking can also be performed using a second identical deformation sensor. In each case, a further supplementary sensor must be located in the vehicle.

An object of the present invention therefore is to provide a deformation sensor of the type described above in which no further supplementary sensor is necessary for its function checking.

SUMMARY OF THE INVENTION

According to the present invention, multiple transmission elements are present which couple the light of various wavelengths into the transmission medium of the deformation sensor and multiple reception elements are present which selectively couple the transmitted light out of the transmission medium according to wavelength. An evaluation unit detects the deviations between the output signals of the reception elements and signals a malfunction of the sensor if the deviations exceed a preset measure.

According to the present invention, checking of the deformation sensors function for errors may be performed simultaneously using one single deformation sensor, in addition to its actual function of deformation sensing. A supplementary sensor which is responsible exclusively for function checking of the deformation sensor may be dispensed with. Since deformations may be sensed and function checking may be performed simultaneously with one single sensor, i.e. no additional querying of a further sensor is necessary, the time between the beginning of a crash with a vehicle and the provision of a trip signal for the restraint systems is reduced.

The transmission medium of the deformation sensor preferably comprises either one or more optical waveguides or a deformable, light-transmitting body. Optical waveguides may be inserted into the deformable, light-transmitting body, for example, to couple light waves into and out of the body. However, reception and transmission elements may also be directly implanted in the deformable, light-transmitting body.

To receive the light waves transmitted via the transmission medium, reception elements which react either uniformly or inversely to a change in intensity of the light transmitted via the transmission medium may be used.

DETAILED DESCRIPTION

Figure 1:
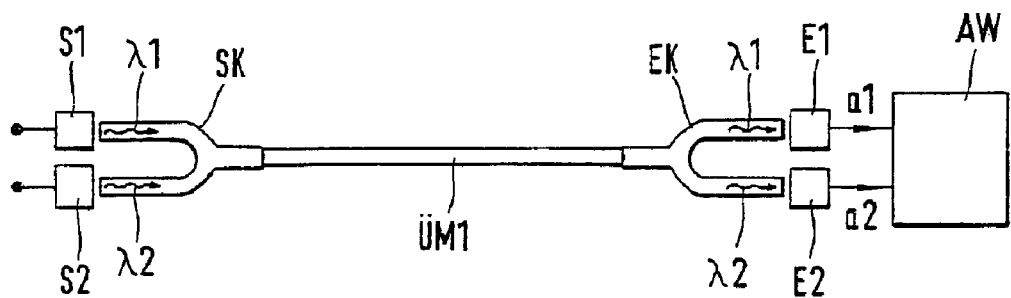
FIG. 1 shows a deformation sensor having an optical waveguide as a transmission medium.

In FIG. 1, a deformation sensor is shown whose optical transmission medium ÜM1 includes one single optical fiber or a bundle of multiple optical fibers. If, for example, the deformation sensor is to be used as a side crash sensor for a vehicle, this optical fiber ÜM1 is preferably installed in a side door of the vehicle. Thus, if a deformation of the side door occurs due to a side crash and thus a deformation, i.e. curvature, of optical waveguide ÜM1 occurs, due to the known microbending effect, this curvature of the optical waveguide causes a change in intensity of the light transmitted via the optical waveguide. This change in intensity of the light transmitted via optical waveguide ÜM1, which is detected as described in the following, therefore provides direct information in the event of a deformation of the vehicle body caused by a crash.

At one end of optical waveguide ÜM1, an optical waveguide junction SK is connected, via which light of two different wavelengths λ1 and λ2 is coupled into waveguide ÜM1 from two optical transmission elements S1 and S2. Transmission elements S1 and S2 are electrooptical converters, e.g. light emitting diodes (LED). The light coupled into optical waveguide ÜM1 from both transmission elements S1 and S2 should be clearly selectable.

Therefore, transmission element S1 transmits, for example, light in infrared wavelength range λ1 and second transmission element S2 transmits, for example, light in ultraviolet wavelength range λ2.

At the other end of optical waveguide ÜM1, an optical waveguide junction EK is connected which distributes the light transmitted via optical waveguide ÜM1 to a first reception element E1 and a second reception element E2. Reception elements E1 and E2 may be conventional photodiodes or photo transistors. To separate two wavelength ranges λ1 and λ2, reception element E1 has a sensitivity for wavelength range λ1 (e.g. infrared) and reception element E2 has a sensitivity for wavelength range λ2 (e.g. ultraviolet). To improve the separation between two wavelength ranges λ1 and ë2 even further, optical filters, which are tuned to desired wavelength ranges λ1 and λ2, may be inserted between the ends of junction EK and reception elements E1 and E2.

Instead of optical waveguide junction EK on the reception side, a wavelength-selective coupler may also be provided, which supplies light separated according to wavelengths λ1 and ë2 to reception elements E1 and E2 at its two outputs.

Electrical output signals a1 and a2 of two optoelectronic reception elements E1 and E2 are supplied to an evaluation circuit AW. During the transmission via optical waveguide ÜM1 of light of both wavelength ranges λ1 and 2 coupled out of transmission elements S1 and S2, a curvature of optical waveguide ÜM1 affects the light of both wavelength ranges λ1 and λ2. Both output signals a1 and a2 of reception elements E1 and E2 thus show a reaction in the form of a change in signal level in the event of a deformation of optical waveguide ÜM1 on the basis of the change in intensity of the transmitted light. Thus, if one of transmission elements S1, S2 or reception elements E1. E2 is defective, a clear mutual deviation will show in both output signals a1 and a2 of reception elements E1, E2. Evaluation circuit AW therefore compares both output signals a1 and a2 of reception elements E1, E2 with one another and signals a malfunction of the sensor if a level deviation which exceeds a preset measure exists between the two output signals a1, a2. In this way, reliable function checking of the sensor may be performed. If a malfunction of the sensor is established, the information that this sensor may not be considered when tripping decisions are made is relayed to a control device for restraint systems present in the vehicle.

If a break of optical waveguide ÜM1 occurs, evaluation circuit AW recognizes this defect in that both output signals a1 and a2 have no signal level.

Figure 2:
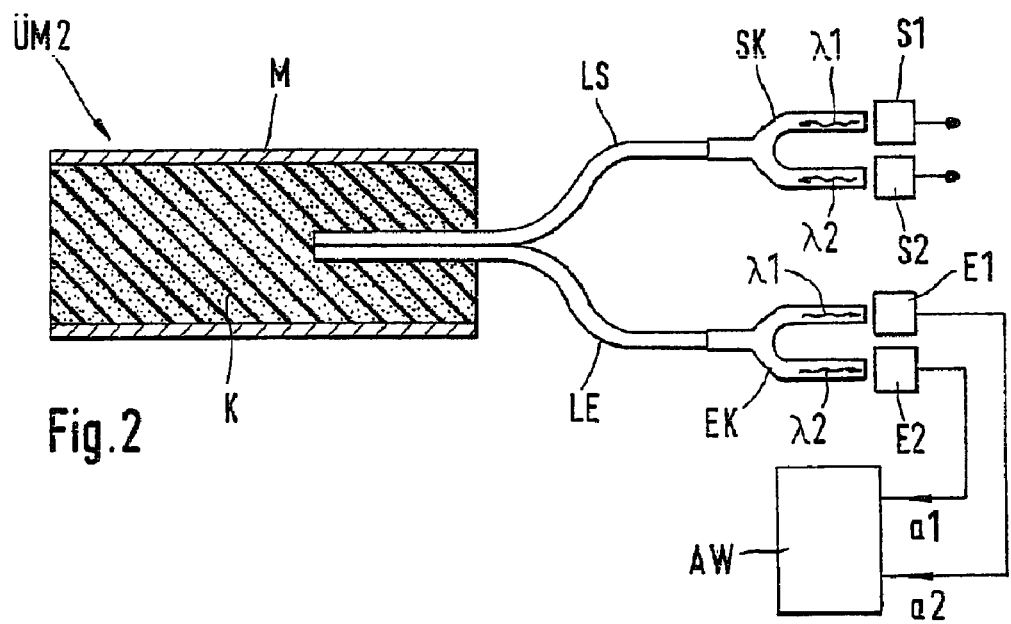
FIG. 2 shows a deformation sensor having a deformable, light-transmitting body with optical waveguides for coupling out light as a transmission medium.

A further exemplary embodiment for a transmission medium of a deformation sensor is shown in FIG. 2. The same means are used for the coupling in and out of light of various wavelength ranges λ1 and λ2 as was already described in connection with the exemplary embodiment of FIG. 1. Therefore, these means will not be described in more detail here.

Transmission medium ÜM2 of the deformation sensor shown in FIG. 2 includes a deformable, light-transmitting body K, which is surrounded by a jacket M which is opaque to light. The deformable, light-transmitting body is made of, for example, polyurethane foam. This body K has the property that it changes its optical scattering properties upon a pressure acting on it from outside or a deformation. Thus, if light is coupled into body K, the intensity of the light coupled out of body K will change in the event of a deformation of body K.

As shown in FIG. 2, light of both wavelength ranges λ1 and λ2 from transmission elements S1 and S2 is coupled into body K1 via optical waveguide junction SK and a transmission optical waveguide LS. This transmission optical waveguide LS penetrates into body K for this purpose. A reception optical waveguide LE also penetrates body K and feeds the light thus coupled out of the body to two reception elements E1 and E2 via the optical waveguide junction and/or via wavelength-selective coupler EK. In the exemplary embodiment shown in FIG. 2, transmission optical waveguide LS and reception optical waveguide LE are introduced into body K at the same location. Notwithstanding this, two optical waveguides LS and LE may penetrate into body K from different sides.

Transmission medium ÜM2 shown in FIG. 2 and its action in the event of a deformation is described in U.S. Pat. No. 5,917,180, cited above.

Figure 3:
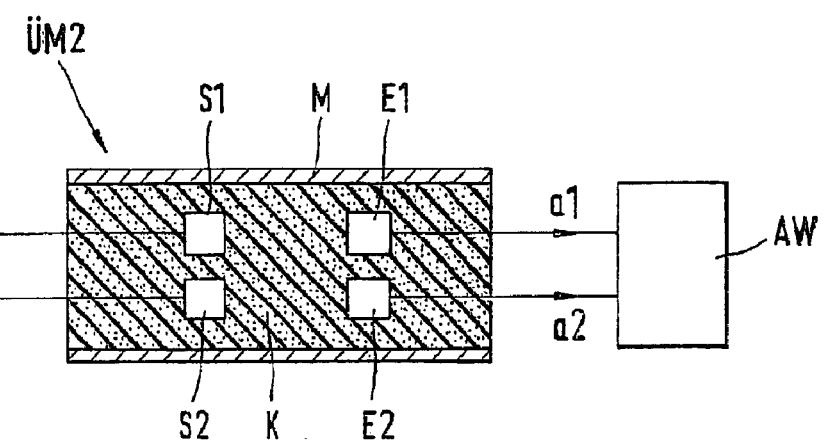
FIG. 3 shows a deformation sensor having a deformable, light-transmitting body, into which transmission and reception elements are directly integrated, as a transmission medium.

The coupling of light into and out of deformable, light-transmitting body K of transmission medium ÜM2 may also occur, as shown in FIG. 3, in that transmission elements S1, S2 and reception elements E1, E2 are integrated directly into body K, allowing the optical waveguides LS, LE, which couple the light in and out, to be dispensed with. There is any desired number of configurations for the insertion locations of transmission elements S1, S2 and reception elements E1 and E2, notwithstanding the exemplary embodiment shown in FIG. 3.

Figure 4:
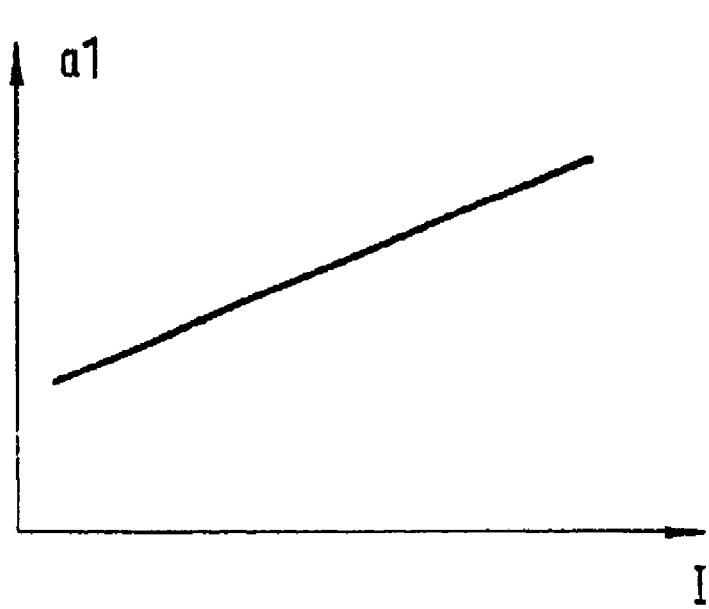
FIG. 4 shows various dependencies of the output signals of the reception elements depending on the intensity of light received.
Figure 4:
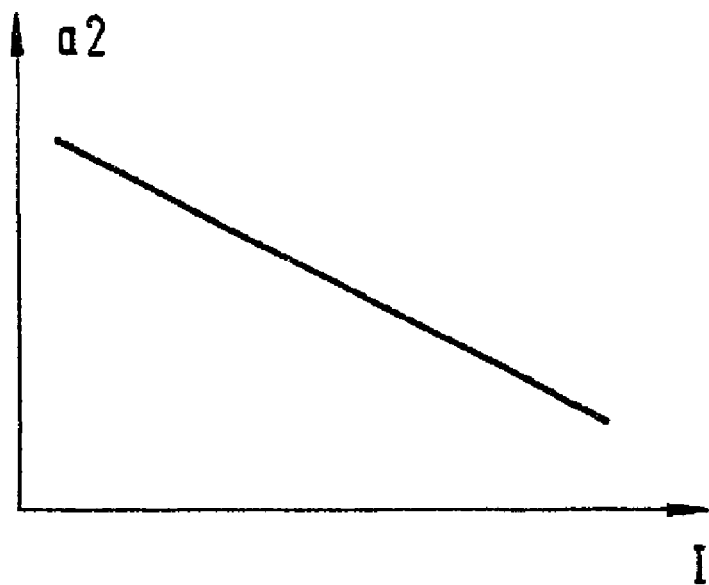

There is the possibility that both reception elements E1 and E2 react uniformly to changes in intensity of the light received, i.e. both output signals a1, a2 of reception elements E1, E2 experience an increase or decrease in level with increasing intensity of the light received. Reception elements E1, E2 may also, however, be implemented in such a way that they react inversely to changes in intensity of the light received. As shown in FIG. 4. for example, the level of output signal a1 of first reception element E1 would then increase with increasing light intensity and the level of output signal a2 of second reception element E2 would drop with increasing light intensity. The evaluation of signals a1 and a2 must then be appropriately adjusted in evaluation circuit AW. Inversely operating receivers have the advantage that interference signals (e.g. those caused by electromagnetic irradiation) and actual measurement signals may be differentiated using them. Output signal levels a1 and a2 of two receivers E1 and E2 are changed in the same direction by malfunctions. In contrast, the actual fractions of light to be measured, which are coupled out of optical transmission medium ÜM1 or ÜM2, respectively, change output signal levels a1 and a2 of receivers E1 and E2 in opposite directions. Malfunctions and measurement signals may thus be differentiated from one another.

What is claimed is:

1. A deformation sensor comprising:
    an optical transmission medium;
    a plurality of transmission elements for transmitting light of various wavelengths into the transmission medium;
    a plurality of reception elements for receiving the light transmitted via the transmission medium, the reception elements selectively receiving the transmitted light out of the transmission medium according to wavelength;
    an evaluation unit for detecting a change in intensity of the received light depending on deformation of the transmission medium, the evaluation unit detecting deviations between output signals of the reception elements and signaling a malfunction of the sensor if the deviations exceed a preset measure; and optical waveguides projecting into the light-transmitting body to couple light waves into and out of the body, wherein the transmission medium is a deformable, light-transmitting body.

2. The deformation sensor according to claim 1, wherein the reception elements react uniformly to changes in intensity of the light transmitted via the transmission medium.

3. A deformation sensor comprising:

an optical transmission medium;

a plurality of transmission elements for transmitting light of various wavelengths into the transmission medium;

a plurality of reception elements for receiving the light transmitted via the transmission medium, the reception elements selectively receiving the transmitted light out of the transmission medium according to wavelength; and an evaluation unit for detecting a change in intensity of the received light depending on deformation of the transmission medium, the evaluation unit detecting deviations between output signals of the reception elements and signaling a malfunction of the sensor if the deviations exceed a preset measure;

wherein the transmission medium includes a deformable, light-transmitting body, and wherein the reception elements and the transmission elements are implanted directly in the light-transmitting body.

4. The deformation sensor according to claim 3, wherein the reception elements react uniformly to changes in intensity of the light transmitted via the transmission medium.

5. The deformation sensor according to claim 3, wherein the reception elements react uniformly to changes in intensity of the light transmitted via the transmission medium.

6. A deformation sensor comprising:

an optical transmission medium;

a plurality of transmission elements for transmitting light of various wavelengths into the transmission medium;

a plurality of reception elements for receiving the light transmitted via the transmission medium, the reception elements selectively receiving the transmitted light out of the transmission medium according to wavelength; and an evaluation unit for detecting a change in intensity of the received light depending on deformation of the transmission medium, the evaluation unit detecting deviations between output signals of the reception elements and signaling a malfunction of the sensor if the deviations exceed a preset measure;

wherein the reception elements react inversely to changes in intensity of the light transmitted via the transmission medium.

7. The deformation sensor according to claims 6, wherein the transmission medium includes a deformable, light-transmitting body.

8. The deformation sensor according to claim 7, further comprising optical waveguides projecting into the light-transmitting body to couple light waves into and out of the body.

9. The deformation sensor according to claim 3 or 6, wherein the transmission medium includes at least one optical waveguide.

10. The deformation sensor according to claim 1, 3 or 6, wherein the transmission elements include electrooptical converters.

11. The deformation sensor according to claim 1, 3 or 6, wherein the transmission elements include light emitting diodes.

12. The deformation sensor according to claim 1, 3 or 6, wherein the reception elements include photodiodes.

13. The deformation sensor according to claim 1, 3 or 6, wherein the reception elements include photo transistors.

14. The deformation sensor according to claim 1, 3 or 6, wherein the change of intensity is measured at the different wavelengths.

* * * * *

UNITED STATES PATENT AND TRADEMARK OFFICE
CERTIFICATE OF CORRECTION

PATENT NO. : 6,864,477 B2
DATED : March 8, 2005
INVENTOR(S) : Frank-Jürgen Stuetzler It is certified that error appears in the above-identified patent and that said Letters Patent is hereby corrected as shown below:

Column 3,
Lines 48-50, change "If a break...no signal level" to -- If a break....no signal level -- (without any paragraph break)

Column 5,
Line 29, change "according to claim 3," to -- according to claim 2 --

Signed and Sealed this

Seventh Day of June, 2005

JON W. DUDAS
*Director of the United States Patent and Trademark Office*